(No Model.)

L. PAGET.
ELECTRODE FOR SECONDARY BATTERIES.

No. 457,555. Patented Aug. 11, 1891.

Witnesses:
J. Leblanc
B. Smith

Leonard Paget
Inventor.

UNITED STATES PATENT OFFICE.

LEONARD PAGET, OF NEW YORK, N. Y.

ELECTRODE FOR SECONDARY BATTERIES.

SPECIFICATION forming part of Letters Patent No. 457,555, dated August 11, 1891.

Application filed June 5, 1890. Serial No. 354,346. (No model.)

*To all whom it may concern:*

Be it known that I, LEONARD PAGET, a citizen of the United States, residing at New York, in the county and State of New York, have invented a new and useful Improvement in the Electrodes for Storage-Batteries, of which the following is a specification.

The object of my invention is to improve the construction of electrodes for storage-batteries; and to this end it consists in a construction embodying the application of the following essential principles, which construction will be fully described in the following specification, and the features constituting the invention pointed out in the claims.

I have discovered that a conducting envelop, such as a metallic covering, surrounding a plate or mass of active material, such as spongy lead, and in electrical communication with the connecting-lug of the electrode only through working-faces of the active material itself is, comparatively speaking, more or less insulated from the connecting-lug, except when the metallic lead is practically wholly reduced or wholly peroxidized—that is, the conductivity of the active material varies with the charge—and in either of these extreme limits is far greater for the same plate than at any intermediate stages, and is least when the lead is sulphated or merely oxidized. By the application of this principle I am able to construct an electrode in which the quantity of current transmitted through the electrode in charging or discharging is controlled directly by and varies with the degree of charge of the active material, so that the present necessity of carefully regulating the charging-current is avoided and no injurious effects result from excessive charge or discharge of current. This principle may be carried into effect by constructions varying widely in mechanical details, and while I describe only the construction which I have found preferable, and a single modification thereof, it will be understood that I do not limit myself to these two methods of practically carrying out my invention; but it is an obvious requisite and I specify this as the essential feature in the construction of an electrode according to my invention, that the metallic covering shall be insulated from the connecting-lug of the electrode by any suitable form of insulation at all points except through the working-faces of the active material. By my invention, moreover, I secure other important advantages, which will be pointed out hereinafter, and provide an electrode that has a longer life than those heretofore in use.

Figure 1:
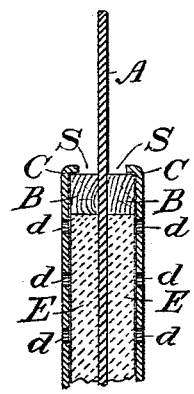
Figure 2:
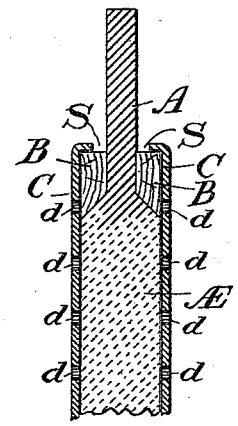
Figure 3:
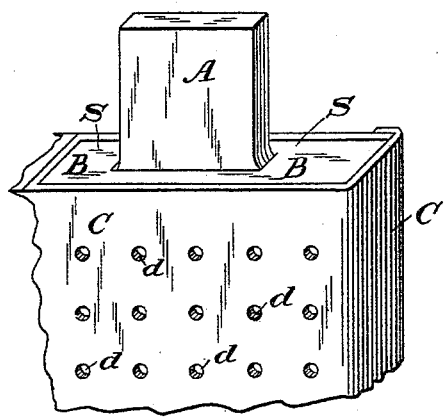

In the accompanying drawings, Figure 1 is a cross-section of a portion of a complete electrode of the preferred construction for carrying out my invention. Fig. 2 is a similar view of a modified form of electrode, and Fig. 3 is a portion of an electrode of either construction shown in quasi perspective.

In Fig. 1, A is a sub-electrode consisting, preferably, of a plate of lead set into an insulating-frame B, which may be of any suitable material, such as insulite or paraffined wood. The plate may be secured in the frame in any suitable manner, but will preferably be inserted in the same manner as a slate is set into its frame, having its ends completely covered by the wood, except where, as shown, it is extended through the frame to form the connecting-lug of the electrode. On both sides of this plate and within the frame B is laid a plate of active material E, formed, preferably, by casting in a chilled mold molten chlorocarbonate or other fusible salt of lead. Surrounding this active material on all sides, except at the edges, where it is covered and insulated by the frame B, is the metallic covering or envelope C, which is preferably a sheet of lead perforated with holes *d*, as shown; but any suitable equivalent construction of the envelope may be used, affording access of the electrolytic fluid to the active material, with large surfaces of contact between the latter and the envelope. The covering or envelope C is carefully insulated from the connecting-lug A on the sub-electrode by the frame B and spaces S, the envelope thus being insulated from both the active material and the sub-electrode, except through the working-faces of the active material.

While the construction above described is preferred, my invention may be carried out without using a sub-electrode. Such a construction is shown in Fig. 2, in which there is no sub-electrode; but the plate of active material E is cast in a fusible salt of lead, which is then reduced to metallic lead by chemical action or the action of an electric current, and then has the connecting-lug A, and, if required, a rim pressed therein to a dense metallic condition. This plate is then set into a frame B and surrounded by a perforated metallic envelope C, insulated from the lug A by the frame and spaces S, as in the construction previously described.

The chief advantages of my improved electrode are as follows: The conducting-envelope being insulated from the connecting-lug, except through the working-faces of the active material, the quantity of current passing through the active material is automatically controlled by the extent of charge, the conductivity of the active material varying with the charge, as above explained. The conducting-envelope being in connection with the whole working-face of the active material, the electrical current taken from the fluid of the battery is very evenly distributed over the surface of the active material, and as this conducting-envelope is nowhere in electrical contact with the connecting-lug, except through the working-faces of the active material, all the current collected by the envelope must pass through the active material in the most effective manner. As the edges of the plate of active material are insulated, they are protected from too early action relatively to the rest of the plate, which early action causes the ultimate disintegration of plates at and near their edges, especially their lower edges. As by the conducting-envelope all parts of the plate of active material are brought into conductive relations with all other parts of the plate and all parts of the liquid in contact therewith, I am able to obtain a higher discharge rate without disintegration of the active material and certainly without its dislodgment. As the plate of active material becomes practically a perfect conductor when fully peroxidized, I conceive that the current continued after that time passes through it without electrolytical surface action, so that this action is confined to the envelope, which may very readily be renewed.

What I claim is—

1. An electrode for a storage-battery having an active core in contact with the connecting-lug of the electrode and a perforated conducting-envelope surrounding the core and insulated from the connecting-lug except through the working-faces of said active core, substantially as described.

2. An electrode for a storage-battery having its active material in contact with the connecting-lug of the electrode and having a perforated conducting-envelope surrounding the active material and controlled in its conductive relations to the connecting-lug of the electrode by the extent of charge of the active material, substantially as described.

3. An electrode for a storage-battery having an active core surrounded by a perforated conducting-envelope and insulated therefrom except on the working-faces of said active core, substantially as described.

4. An electrode for a storage-battery consisting of a sub-electrode forming the connecting-lug of the electrode, a body of active material in contact with said sub-electrode, and a perforated conducting-envelope surrounding the active material and insulated from the sub-electrode except through the working-faces of the active material, substantially as described.

5. An electrode for a storage-battery consisting of a sub-electrode of lead forming the connecting-lug of the electrode, a body of spongy lead forming the active material and in contact with said sub-electrode, and a perforated lead envelope surrounding the active material and insulated from the sub-electrode except through the working-faces of the active material, substantially as described.

6. An electrode for a storage-battery consisting of a body of fusible salts of lead forming the active material, an insulating-frame covering the edges of said body of active material, a connecting-lug for said active material, and a perforated conducting-envelope in contact with the working-faces of the active material, but insulated from the edges of the active material and from the connecting-lug by the insulating-frame, substantially as described.

7. An electrode for a storage-battery consisting of sub-electrode A, forming the connecting-lug, insulating-frame B, two plates of active material E, consisting of fusible salts of lead lying on opposite sides of the sub-electrode, and a perforated conducting-envelope C, surrounding the active material, substantially as described.

LEONARD PAGET.

Witnesses:
E. L. PAGET,
B. SMITH.